(12) United States Patent
Prokhorov et al.

(10) Patent No.: US 8,687,898 B2
(45) Date of Patent: Apr. 1, 2014

(54) SYSTEM AND METHOD FOR OBJECT RECOGNITION BASED ON THREE-DIMENSIONAL ADAPTIVE FEATURE DETECTORS

(75) Inventors: Danil V. Prokhorov, Canton, MI (US); Michael R. James, Northville, MI (US)

(73) Assignee: Toyota Motor Engineering & Manufacturing North America, Erlanger, KY (US)

( * ) Notice: Subject to any disclaimer, the term of this patent is extended or adjusted under 35 U.S.C. 154(b) by 689 days.

(21) Appl. No.: 12/697,808

(22) Filed: Feb. 1, 2010

(65) Prior Publication Data

US 2011/0188737 A1    Aug. 4, 2011

(51) Int. Cl.
 *G06K 9/62* (2006.01)
(52) U.S. Cl.
 USPC .......................... 382/224; 382/154; 382/159
(58) Field of Classification Search
 None
 See application file for complete search history.

(56) References Cited

U.S. PATENT DOCUMENTS

| | | | |
|---|---|---|---|
| 2,903,002 A | 9/1959 | Adkins | |
| 3,430,851 A | 3/1969 | Abt | |
| 3,658,249 A | 4/1972 | Sharpe | |
| 5,277,208 A | 1/1994 | Mansur | |
| 5,423,340 A | 6/1995 | Campbell et al. | |
| 5,644,386 A | 7/1997 | Jenkins et al. | |
| 5,954,071 A | 9/1999 | Magliocca | |
| 6,026,189 A | 2/2000 | Greenspan | |
| 6,236,749 B1 | 5/2001 | Satonaka et al. | |
| 6,405,877 B1 | 6/2002 | Nemedi et al. | |
| 6,608,913 B1 | 8/2003 | Hinton et al. | |
| 6,823,261 B2 | 11/2004 | Sekiguchi | |
| 7,146,991 B2 | 12/2006 | Stockert | |
| 7,343,039 B2 | 3/2008 | Liu et al. | |
| 7,477,780 B2 | 1/2009 | Boncyk et al. | |
| 7,480,414 B2 | 1/2009 | Brown et al. | |
| 7,496,449 B2 | 2/2009 | Samukawa et al. | |

(Continued)

FOREIGN PATENT DOCUMENTS

| | | |
|---|---|---|
| DE | 101 48 063 | 4/2003 |
| JP | 6-47353 | 2/1994 |

(Continued)

OTHER PUBLICATIONS

Freund, Yoav et al., "A Short Introduction to Boosting," Journal of Japanese Society for Artificial Intelligence, vol. 14, No. 5, pp. 771-780, Sep. 1999.

(Continued)

*Primary Examiner* — Jason M Repko
*Assistant Examiner* — Jhere Rowland
(74) *Attorney, Agent, or Firm* — Oblon, Spivak, McClelland, Maier & Neustadt, L.L.P.

(57) ABSTRACT

Method and system for imaging an object in three-dimensions, binning data of the imaged object into three dimensional bins, determining a density value p of the data in each bin, and creating receptive fields of three dimensional feature maps, including processing elements O, each processing element O of a same feature map having a same adjustable parameter, weight Wc1. The density values p are processed with the processing elements O to determine an output value o for at least each three dimensional location of the imaging of the object having a density value p above a predetermined threshold value. An object is classified by processing the output values o with a committee of classifiers, and the classification of the object is communicated.

21 Claims, 7 Drawing Sheets

(56) References Cited

U.S. PATENT DOCUMENTS

| | | |
|---|---|---|
| 7,558,762 B2 | 7/2009 | Owechko et al. |
| 7,634,142 B1 * | 12/2009 | Bourdev et al. ............... 382/224 |
| 2005/0147297 A1 * | 7/2005 | McLaughlin et al. ........ 382/171 |
| 2005/0157931 A1 | 7/2005 | Delashmit et al. |
| 2005/0286767 A1 | 12/2005 | Hager et al. |
| 2006/0103927 A1 | 5/2006 | Samukawa et al. |
| 2006/0110029 A1 | 5/2006 | Kazui et al. |
| 2006/0262007 A1 | 11/2006 | Bonthron et al. |
| 2007/0127816 A1 | 6/2007 | Balslev et al. |
| 2007/0217676 A1 | 9/2007 | Grauman et al. |
| 2008/0021625 A1 | 1/2008 | Ohtomo |
| 2008/0042895 A1 | 2/2008 | Inaba |
| 2008/0187227 A1 | 8/2008 | Bober et al. |
| 2009/0103779 A1 | 4/2009 | Loehlein et al. |
| 2009/0316986 A1 * | 12/2009 | Hua et al. ..................... 382/170 |
| 2010/0061609 A1 * | 3/2010 | Shinagawa et al. ........... 382/131 |
| 2010/0092073 A1 | 4/2010 | Prokhorov |
| 2010/0284622 A1 * | 11/2010 | Kim et al. ..................... 382/224 |

FOREIGN PATENT DOCUMENTS

| | | |
|---|---|---|
| JP | 9-85189 | 3/1997 |
| JP | 10-283478 | 10/1998 |
| JP | 2002-303671 | 10/2002 |
| JP | 2006-48568 | 2/2006 |
| JP | 2007-142517 | 6/2007 |

OTHER PUBLICATIONS

U.S. Appl. No. 12/252,080, filed Oct. 15, 2008, Inventor: Danil V. Prokhorov.

* cited by examiner

SYSTEM AND METHOD FOR OBJECT RECOGNITION BASED ON THREE-DIMENSIONAL ADAPTIVE FEATURE DETECTORS

BACKGROUND

1. Field of Invention

This disclosure relates generally to computerized object recognition and, more particularly, to object recognition and classification using a three-dimensional (3D) system.

2. Discussion of the Background

Computerized object recognition is the process of finding or identifying an object in an image or video. Recognizing an object can include the process of classifying objects belonging to distinct classes. Object classifying using computer vision can be applied to, among other things, automated production processes, security, and automotive applications.

Typical current technology for object recognition uses images from a camera or another suitable sensor. Each image serves as an input to an object recognition algorithm, such as a neural network or another machine learning system. The image is usually fed into the algorithm as a collection of features, e.g., pixel intensities. The temporal order of such features is meaningless in the context of the single image. More importantly, the number of features can be very large, making the task of object recognition computationally very demanding.

Object recognition is known to be especially difficult if the object position and orientation is not constrained (i.e., the object may appear from an arbitrary viewing angle). In order to recognize and classify objects with a high degree of reliability, computer vision systems need to account for this variance. Also, reliable rotational invariant recognition of objects has remained an unsolved problem.

U.S. application Ser. No. 12/252,080, filed on Oct. 15, 2008, describes a system and method for object recognition and classification using a 3D system with adaptive feature detectors, which addresses aspects of the rotational invariant recognition of objects. However, the system and method described therein, in some aspects, is computationally demanding and can benefit from more accurate recognition of objects. U.S. Ser. No. 12/252,080 is incorporated herein in its entirety by reference.

SUMMARY

In order to address these problems among others, the present invention uses data from a 3D imaging device, such as a 3D laser scanner. Unlike traditional two-dimensional scanners, also known as line scanners, 3D imaging devices can provide highly accurate distance measurements in the spherical coordinate system.

The invention further enables the recognition task to be carried out directly in the original 3D space, rather than performing projections of the original 3D data onto 2D surfaces such as employed by conventional imaging devices and 2D laser scanners. Instead of choosing features a priori, 3D features represented as collections of adjustable parameters (weights) which are made adaptive and learned from data representing the object in three dimensions.

In order to obtain a system with decreased sensitivity to rotational invariance (i.e., a "rotation invariant system"), aspects of this disclosure include the option of multiple binned 3D data as inputs for the system. The binned data shows different viewing angles for the same objects as simultaneously presented to the system for object classification. Unlike U.S. Ser. No. 12/252,080, however, the 3D features learned from data are fed into a committee of object classifiers, each of which uses only a subset of all available features. Collectively, such a committee of classifiers, called a "strong" classifier, can be made to be much more powerful (accurate at object detection and classification) than any of the individual classifiers called "weak" classifiers.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
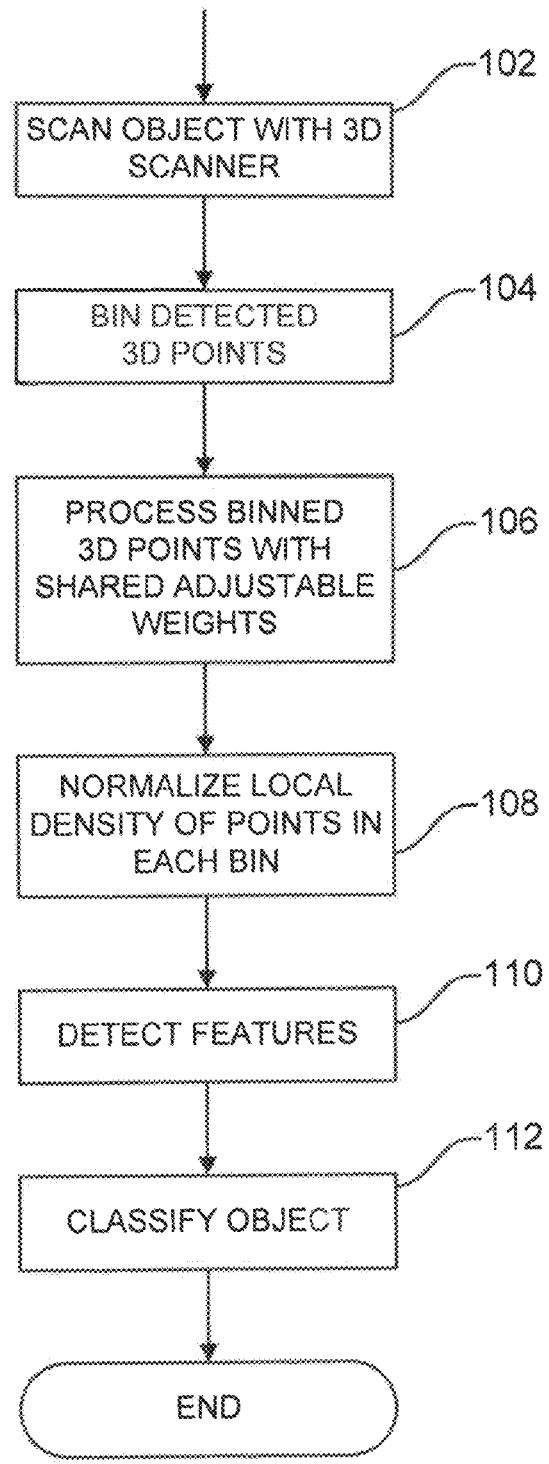
FIG. 1 is a flowchart illustrating algorithm for calculating an output of processing elements of a computational system according to an aspect of this disclosure.

Referring now to the drawings, wherein like reference numerals designate identical or corresponding parts/steps throughout the several views. FIG. 1 is a flowchart illustrating steps for calculating an output of processing elements of a computational system according to one embodiment of this disclosure. In step 102, an object is scanned using a 3D scanner. Imaging of an object can be accomplished in three dimensions using both scanning and non-scanning systems. The invention is not limited to a scanning system, but a system providing highly accurate distance measurements is preferred, such as a scanning system employing a 3D laser. Preferably, the 3D laser design includes many laser sending-receiving heads rotating around a vertical axis.

The data from a 3D scanner can be represented conveniently in three spatial dimensions: X coordinate, Y coordinate, and Z coordinate of the Cartesian coordinate system. However, the computational system of this disclosure can be adapted to use a different coordinate system, such as a scanner's original spherical system, or polar coordinates.

Figure 2A:
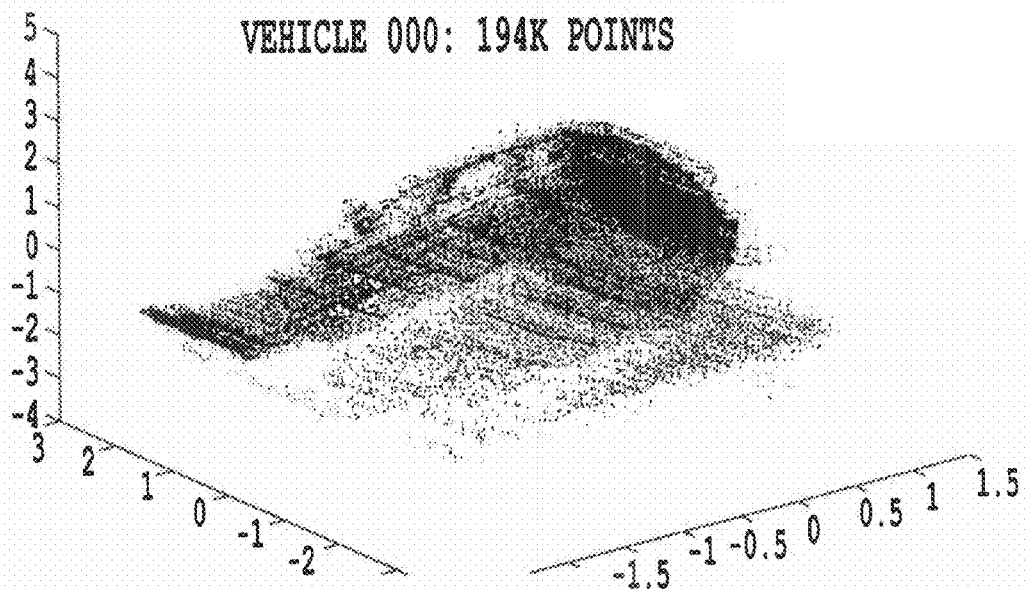
FIGS. 2A and 2B illustrate a 3D scan of a vehicle and a non-vehicle, respectively.
Figure 2B:
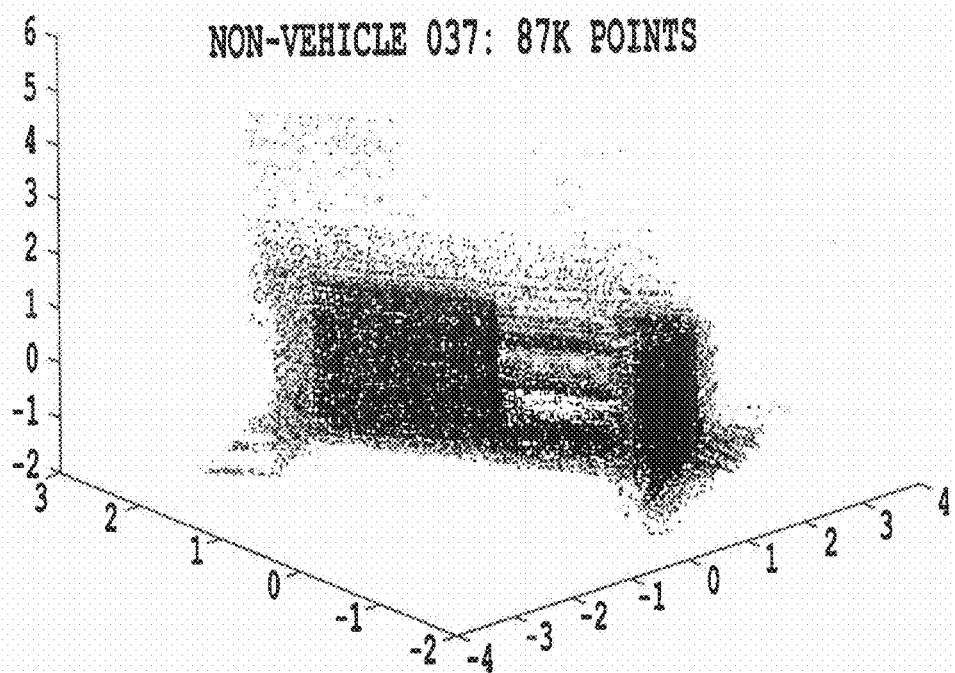

FIGS. 2A and 2B illustrate how two different classes of objects (vehicle #000 and non-vehicle #037) may look when plotted in X, Y, and Z coordinates, when normalized to have an approximately zero mean and unity standard deviation. These figures show approximately 100,000 to 200,000 data points for each object collected over several seconds of observing the stationary objects from a moving platform equipped with a 3D scanner. The step of converting the platform-centered coordinates into stationary or moving with the object of interest X, Y, Z coordinates is understood by those of ordinary skill in the art and thus not described here. Object motion can reduce the number of points associated with the object, but the reduced number of points does not change the operation principle of this disclosure.

In step 104, the original 3D data points are binned into pre-specified regions of 3D space. For example, the regions are defined as cubes of the 3D grid spanning the space occupied by the object, which creates a 3D histogram. Further, 3D rectangles are advantageous to use as binned regions when one of the coordinates has a different resolution along its coordinate axis.

Figure 3A:
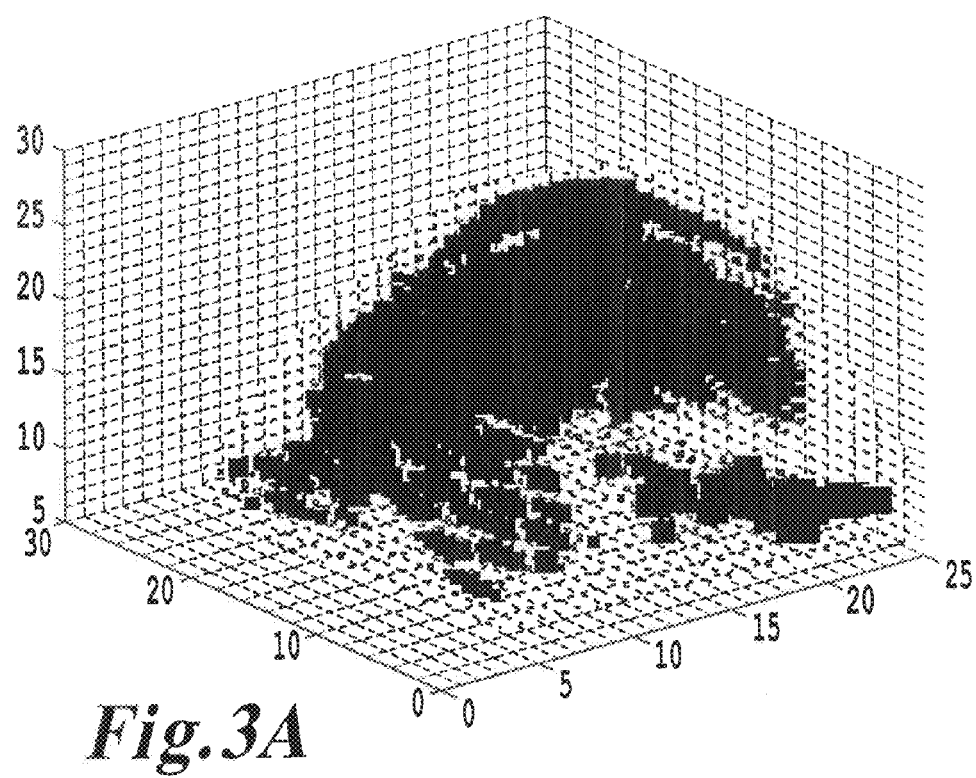
FIGS. 3A and 3B illustrate a binned representation of the vehicle and the non-vehicle according to an aspect of this disclosure.
Figure 3B:
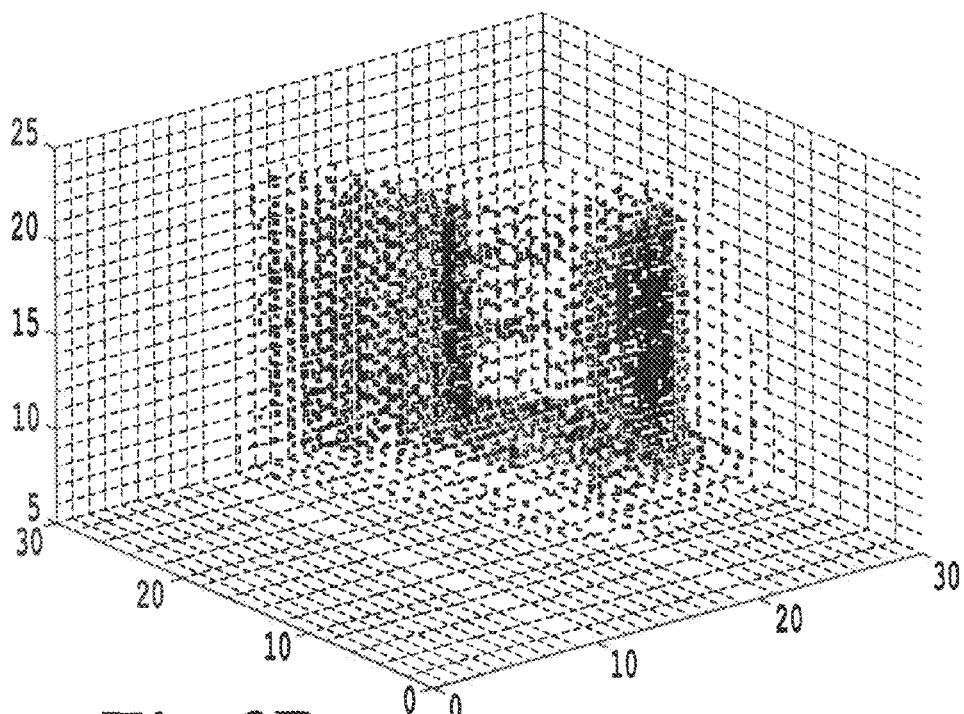

FIGS. 3A and 3B illustrate the objects of FIGS. 2A and 2B, respectively, after the binning operation has been performed. The size of the squares in FIGS. 3A and 3B reflect the relative density of the data points in particular bins.

Figure 4:
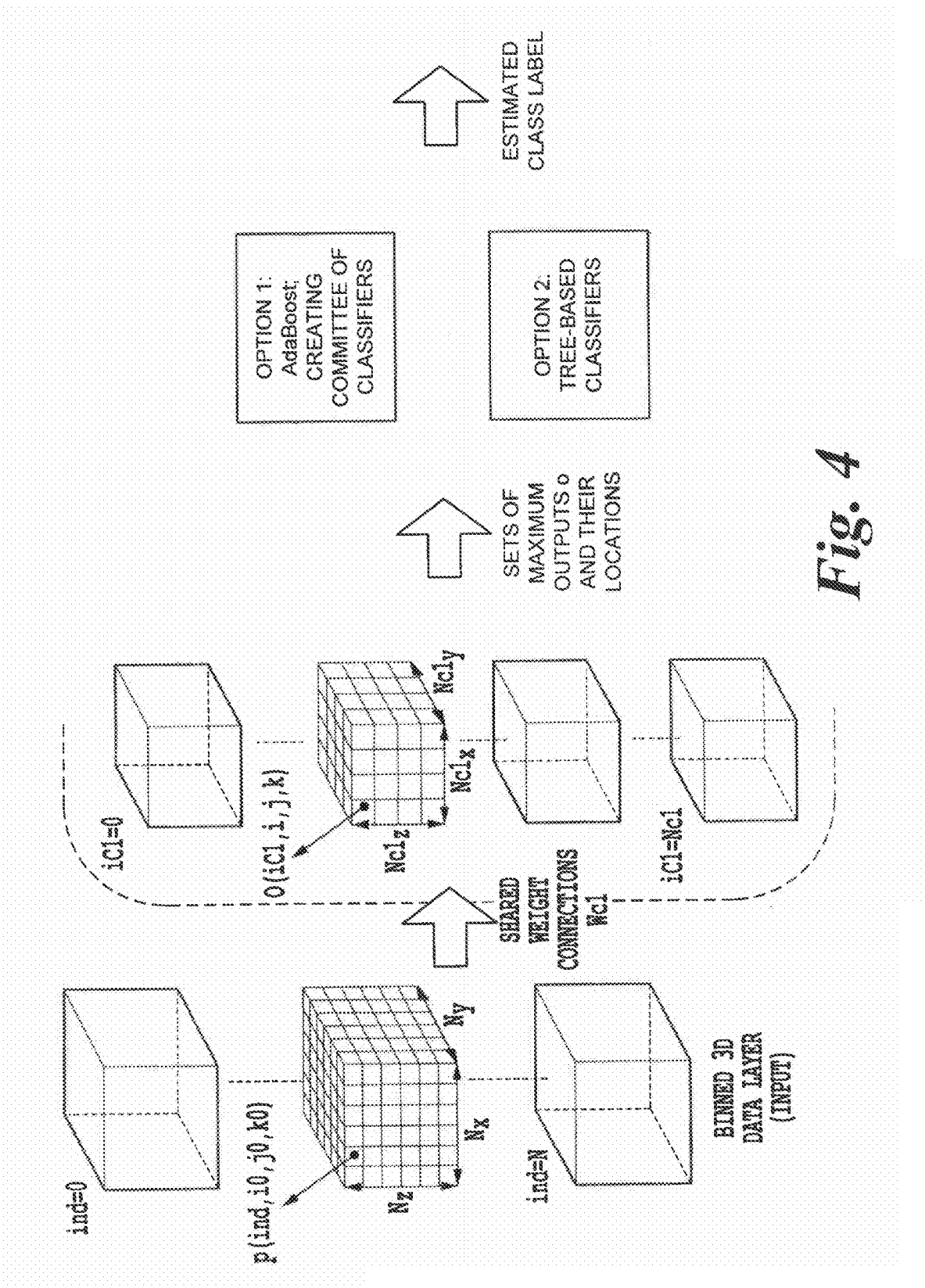
FIG. 4 illustrate a multi-layer object classification system according to an embodiment of this disclosure.

In step 106, the binned 3D data is processed by a computational system with shared adjustable parameters (weights), which is functionally depicted in the computational system shown in FIG. 4. The local density of points in each bin is denoted $p(ind, i, j, k)$ where ind is the index of the binned 3D data, and i, j, and k are coordinates of the bin (see FIGS. 2 and 3). The index ind corresponds to a different viewing angle of the same object, e.g., ind=0 denotes the binned 3D data for the object rotated 90 degrees from its default angle of viewing, and ind=1 denotes the binned 3D data for the object rotated −90 degrees from its default angle of viewing. The invention does not require multiple views (indexes) and can be implemented using only the default view of the 3D imaging device. Further, the above-describes notation for the indexes can be varied by one skilled in the art.

However, to obtain a rotationally invariant system, the present invention uses multiple binned 3D data as inputs for the system. The binned data shows different viewing angles for the same objects as simultaneously presented to the system for object classification. This multi-view arrangement is shown in FIG. 4 where the input layer has multiple binned 3D views of the object indexed by the index ind.

The density values p are normalized over the entire set of points belonging to the same object (same index ind) at step 108. Such a normalization can be done in a variety of ways, e.g., by computing an average density of points per bin and subtracting the average density from each bin's density. As an alternative, scaling by a standard deviation from the average density can be employed to normalize the density values p. Logarithmic normalization can also be employed if binned densities differ by orders of magnitude.

The density values p of the map are then fed into a first layer of the system. The first layer includes Nc1 three-dimensional maps having a processing element O for each of the input bins. In each map, every processing element O is restricted to have the same values of weights Wc1 (adjustable parameters) connecting the processing elements O with elements of the inputs $p(ind, i, j, k)$. These weights form the receptive field or the adaptive feature vector. By restricting the weights to have the same values among different processing elements O, computational complexity of the overall system is reduced. Further, effective and adaptive feature detectors are created for learning various features of the object regardless of their location in the binned 3D data.

The number of weights Wc1 depends on the size of the receptive field of the processing elements in the first layer. Without loss of generality, the size of the receptive filed can be specified as dx, dy, and dz in coordinates of the binned 3D data. The processing elements O then implement generally a nonlinear transformation f (e.g., a hyperbolic tangent or a threshold) on a product of the weights Wc1 and the data. The number of weights Wc1 also depends on the connectivity pattern between the inputs and the first layer.

Generally, the size of each receptive field can differ from one feature map to another to allow the system to perform feature detection at step 110 and subsequent recognition at different spatial scales. This is reflected by specifying dependencies of feature map sizes (Nc1x, Nc1y, Nc1z) and receptive field resolutions (dx, dy, dz) on the map index ic1. As a result, a diverse set of receptive fields Wc1 can be created through random initialization or unsupervised training, which is discussed in more detail below.

Not only the output values $o(ic1, i, j, k)$, but also their locations are expressed as triplets (i, j, k) in each feature map and can reflect important information about an object to be recognized. 3D scanner data is often quite sparse, meaning that there will be many bins negligibly small densities $p(ind, i0, j0, k0)$, with correspondingly small output values. Thus, output values o can be ranked, and a first M maxima can be chosen, along with their locations in the feature map ic1, as shown in FIG. 4.

These M maxima and their respective locations can be used as inputs for creating (training) a "weak" classifier for object recognition. A classifier is defined as "weak" if it is unlikely that the classifier trained on the data processed by just one feature map provides high-accuracy object classification, and it is much more likely that a committee of "weak" classifiers (each of which are trained on the data processed by different feature maps) can collectively form a "strong" classifier. A classifier is defined as "strong" if it is likely to provide accurate object recognition. Strong classifiers (i.e. collections of weak classifiers) are used to classify an object in step 112.

Classifiers can be trained using one of many known algorithms, e.g., linear discriminant, logistic regression/neural network, Support Vector Machine (SVM), etc., with the goal of separating the available binned data into at least two classes: an object of interest (i.e. a vehicle) and the rest of objects (i.e. a non-vehicle). To achieve optimum results, the training algorithm should be computationally simple/fast, as the training process is repeated several times in a preferred aspect which includes the AdaBoost process, as discussed below.

AdaBoost, or "Adaptive Boosting," is a machine learning algorithm introduced by Freund and Schapire. An introduction of AdaBoost is provided in "A Short Introduction to Boosting," by Yoav Freund and Robert E. Schapire in the Journal of Japanese Society for Artificial Intelligence, 14(5): 771-780, September, 1999, the entirety of which is incorporated herein by reference.

Generally, AdaBoost is a process of several training iterations and re-weighting of data. The process trains a new ("weak") classifier using a data set in which the weighting coefficients of data points (binned representations of objects) are adjusted according to the performance of a previously trained "weak" classifier so as to give greater weight to the points misclassified by the previous classifier. Finally, when the desired number of "weak" classifiers has been trained, they are combined to form a committee of classifiers ("strong" classifier) using weighting coefficients that assign different weights to different "weak" classifiers. However, from the standpoint of computational efficiency at the operation (after training) stage, the AdaBoost process can end up utilizing too many "weak" classifiers with their respective inputs to create a "strong" classifier of acceptable performance (low enough error rate).

Figure 5:
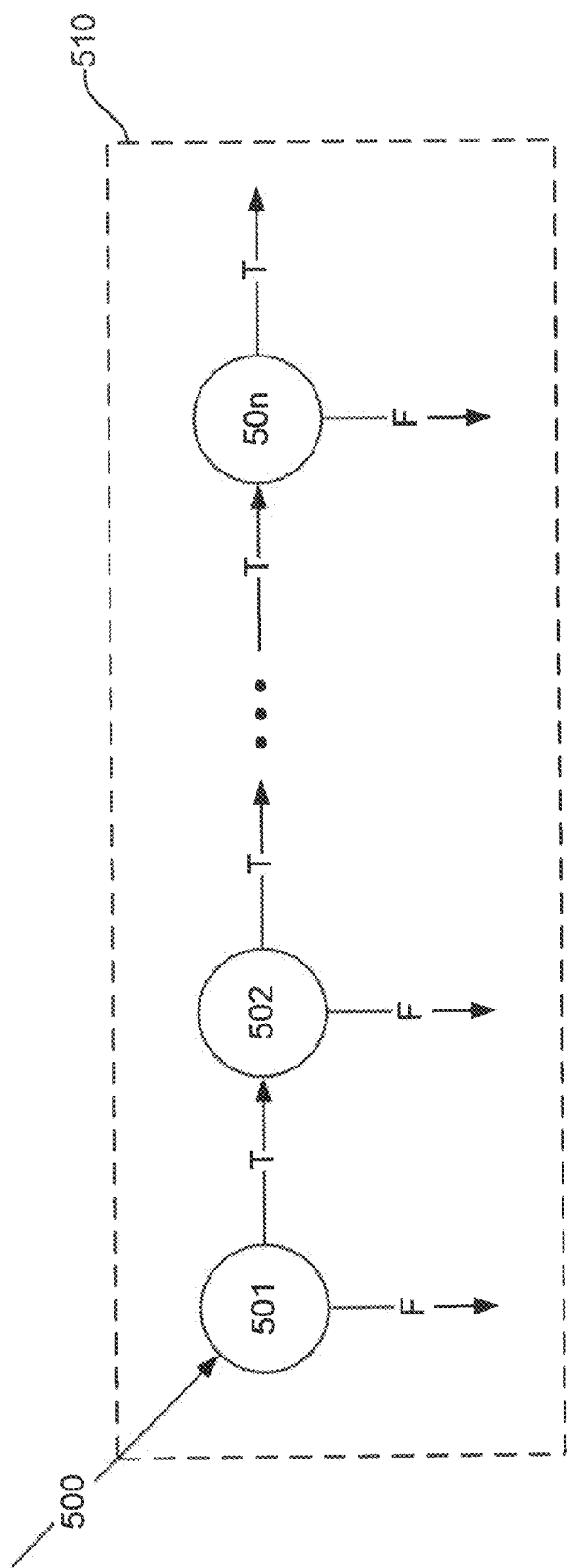
FIG. 5 illustrates a exemplary classifier scheme for creating a strong classifier as a cascade of weak classifiers.

According to an aspect of this disclosure, the "strong" classifier is simplified by cascading several "weak" classifiers. Such a cascade, or a sequential arrangement of classifiers, preferably uses only a small subset of total inputs required by the original "strong" classifier of the AdaBoost process, thereby significantly reducing overall computational complexity. FIG. 5 depicts such an arrangement of weak classifiers forming a strong classifier.

In particular, FIG. 5 shows a classifier cascade for improved computational efficiency. The first classifier 502 receives a set of inputs 500. The inputs 500 are rejected from further consideration if the classifier 502 determines they do not pertain to the target object (FALSE—arrow F), while the accepted inputs are passed to the second classifier 504 for classification (TRUE—arrow T). The cascaded processing can be continued until the desired level of performance is achieved while maintaining superior computational efficiency. For example, the weak classifiers can continue to third and final classifier 50n, or additional weak classifiers can be included to achieve a desired level of performance of the collective strong classifier 510.

In one particular aspect, suppose a false alarm (of detections) of less than 10% was desired and each of classifiers 501, 502 and 50n detected 100% of target objects while having 30%, 40% and 35% chances of false alarms, respectively. The cascaded accuracy would then be equivalent to 6% (0.3×0.4×0.5=0.06), which is below the 10% threshold desired, but obtained by using three weak classifiers, each having thresholds three to four times the desired threshold.

In an alternative embodiment, the M maxima and their respective locations for one feature map ic1 is combined with the same information provided by other feature maps. It is convenient to employ any of the known approaches to training tree-based classifiers for processing combined information from different feature maps for object recognition. For instance, a tree-based classifier can be trained by a variety of known approaches (e.g., C4.5, CART, etc.). Furthermore, an ensemble of tree-based classifiers can be obtained by using the random forest approach.

Figure 6:
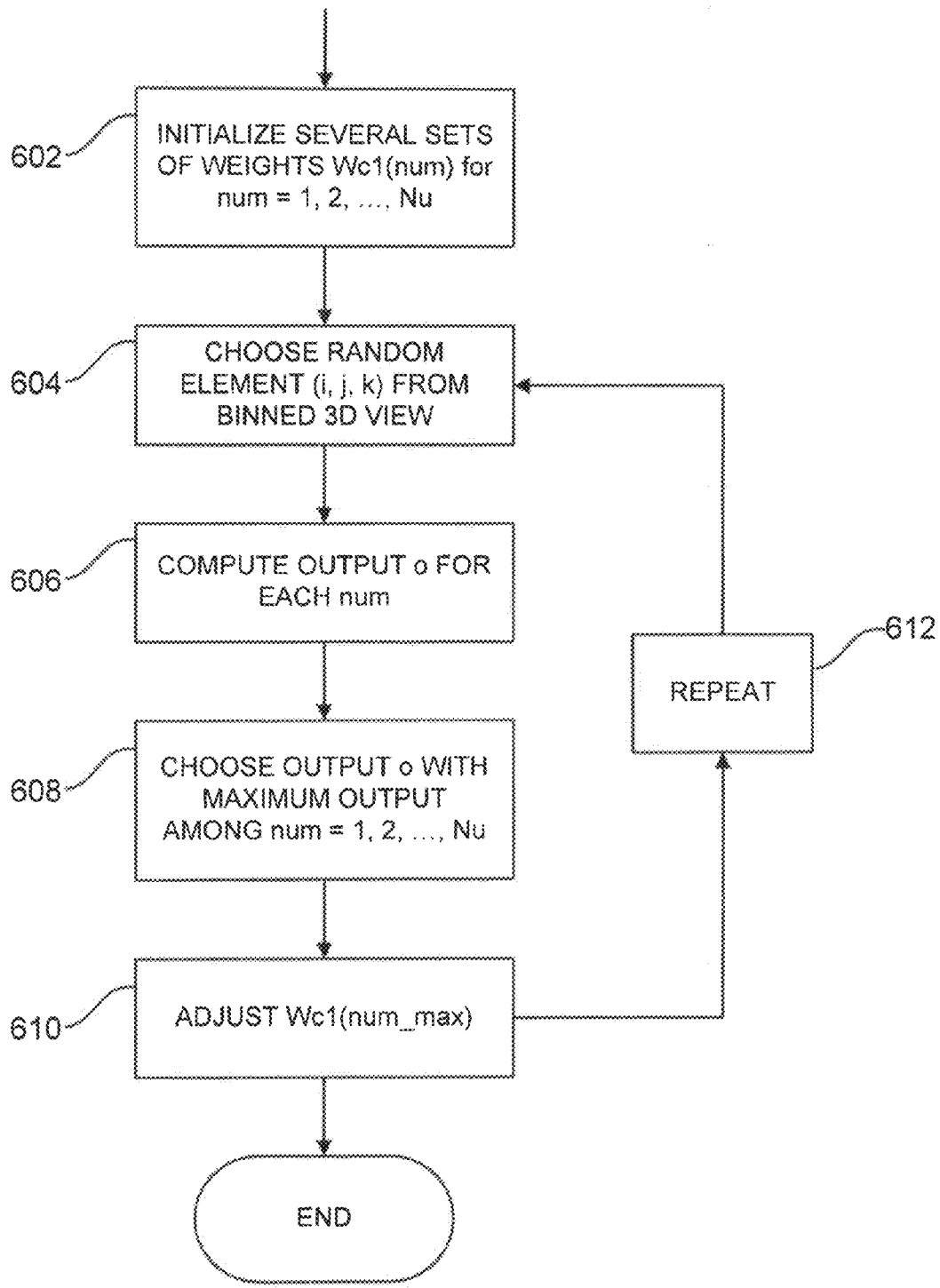
FIG. 6 is a flowchart illustrating steps for an unsupervised training algorithm.

Such an "unsupervised" procedure for learning 3D features from data is described below, with reference to FIG. 6. The goal of such unsupervised training is to recover the most useful adaptive features represented through the sets of weights Wc1 for ic1=0, 1, ..., Nc1 based on the training data. Such training does not utilize the class label information, hence it being called unsupervised training.

At Step 602, several sets of weights Wc1 (num) are initialized for num=1, 2, ..., Nu, which can be implemented in a variety of ways. For example, implementations can be random or intentional. An age(num)=1 is set for all num. At Step 604, an element (i, j, k) of the binned 3D view is randomly chosen, and at Step 606, an output o(num) is computed for each num.

Step 606 includes: computing a scalar product between the appropriate elements of the receptive field Wc1(num) and the data elements p(ind) centered around (i, j, k), which is indicated as scalar_product(Wc1(num)*p(ind)); computing Euclidian norms of Wc1(num) and p(ind); and computing o(num)=f(scalar_product(Wc1(num)*p(ind))/(norm(Wc1(num))*norm(p(ind)))). Then, at step 608, a maximum output o(num_max) is chosen among num=1, 2, ..., Nu.

Wc1(num_max) is adjusted at Step 610 according to the following equations implementing a form of the well known Hebbian adaptation rule. First, mu is determined according to: mu=0, if age(num_max)≤t1; mu=c*(age(num_max)−t1)/(t2−1) if t1<age(num_max)≤t2; and mu=c+(age(num_max)−t2)/r if t2<age(num_max), where c, r, t1 and t2 are design parameters. Further, p 1(t)=(age(num_max)−1−mu)/age (num_max), and p2(t)=(1+mu)/age(num_max). Consequently, Wc1(num_max, index)=p1(t)*Wc1(num_max, index)+p2(t)*p(ind, index)*o(num_max).

The above-described process is repeated (Step 612) from Step 604 until little changes in Wc1 are observed.

In this unsupervised training algorithm, the parameter age is used to select Nc1 sets of weights Wc1 which have sufficiently large age. This is accomplished by ordering the ages of all Nu processing elements and discarding those Nu-Nc1 elements whose age is smaller than a threshold. The set of weights Wc1 remains fixed (constant).

As an option, random initialization of 3D features can be implemented instead of the unsupervised learning described above. In such a case, Nc1 sets of weights Wc1 are initialized at random, e.g., by drawing the Wc1 values from a random uniform or normal distribution. It is likely that the random selection of weights Wc1 will require a number Nc1 much larger than that of the case when the weights are learned in the unsupervised process described above.

The object recognition is known to be especially difficult if the object position and orientation (pose) is not constrained, i.e., the objects may appear from an arbitrary viewing angle, as is the case in this object recognition problem. To obtain a system with decreased sensitivity to rotational invariance ("rotation invariant system"), multiple binned 3D data is used as inputs for the system. These data show different viewing angles for the same objects as simultaneously presented to the system for object classification. This arrangement is shown on FIG. 4, where the input layer may have multiple binned 3D views of the object indexed by the index ind.

As discussed above, each feature map can produce M maxima of the ranked output values o, along with their respective locations in the feature map. Rotations and corresponding multiple binned views of the same object can naturally change the locations of the maxima. Each feature map can therefore process each of the binned views sequentially to determine corresponding sets of M maxima and their locations in the binned views (N+1 sets, see FIG. 4). Then, a determination can be made as to which of the sets has the highest maxima among its M values (e.g., the sum of M maxima is the highest among the sets). This set specifies the best binned view for the feature map ic1.

It is possible that best binned views will be different among different feature maps. To resolve such inconsistency, simple voting can be used, i.e., choose the view which gets the largest number of best view votes from all feature maps. To reduce the possibility of view inconsistency among feature maps, the training (or initialization) process can be structured for receptive fields Wc1 by using the single binned view only. The view voted by the majority of feature maps can be used for subsequent processing for the purpose of object classification, as described above.

The proposed system is naturally amenable to parallel computer implementation. For example, all feature maps can be implemented on individual, parallel running CPUs (or cores in multi-core architectures), and training several "weak" classifiers can also be done in parallel for increased computational efficiency.

In summary, the above-described approaches generally follow the algorithm/process shown in FIG. 1, which includes: (1), converting available 3D scanner data into normalized binned representations, possibly with multiple views of the same objects; (2), creating a diverse set of receptive fields Wc1 through random initialization, unsupervised training or using prior knowledge of the problem domain; (3), detecting useful features in the data as determined by data processing in feature maps for the best (majority voted) view; and (4), classifying objects by developing a committee of classifiers through application of AdaBoost (with or without cascading classifiers) or tree-based methods (supervised training). Additionally, the approach can be verified on a data set not used for training (test set), and the process can return to step 1 or 2 should the test set performance be inadequate to, e.g., add more data, change training parameters, etc.

Figure 7:
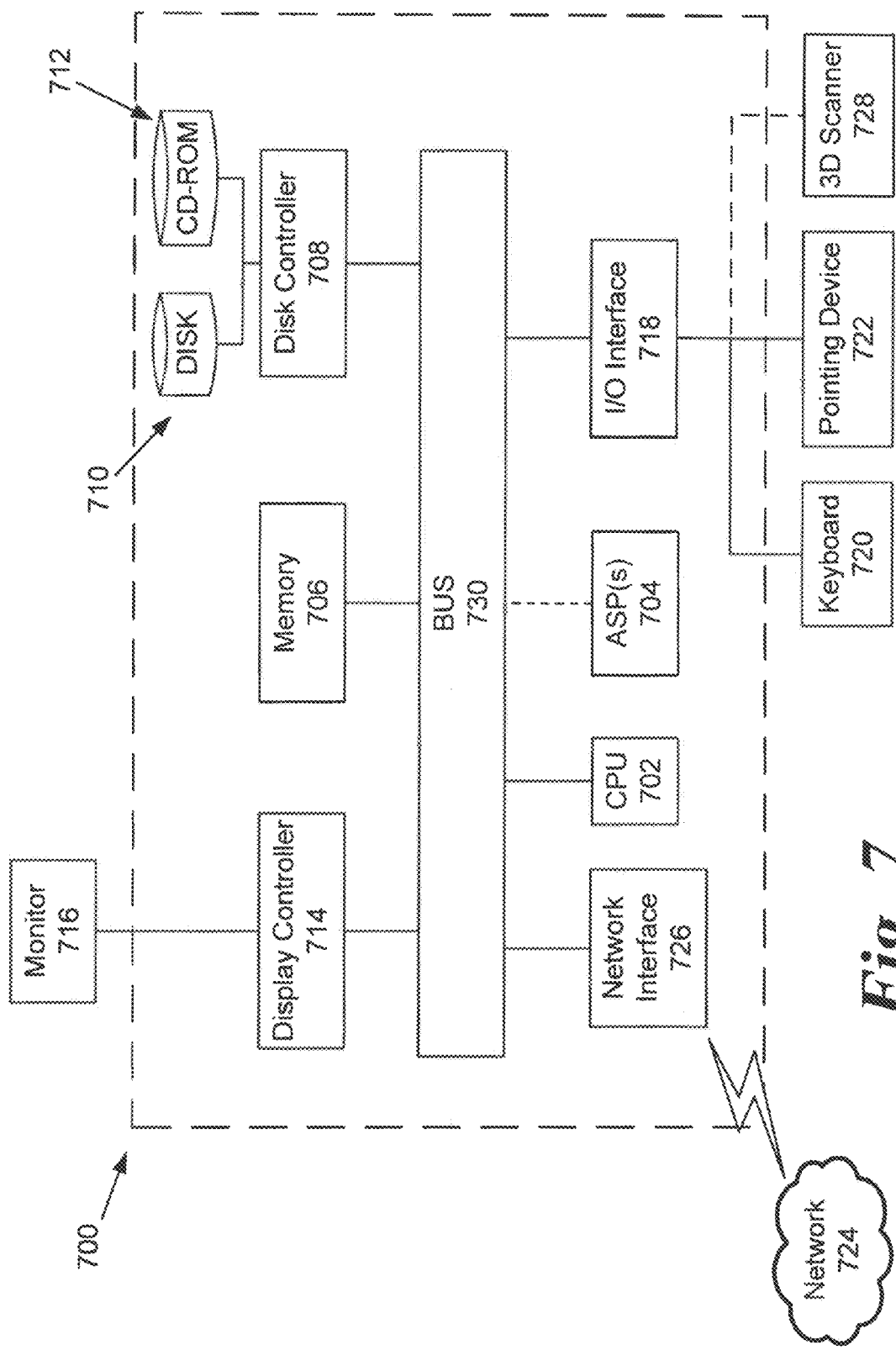
FIG. 7 is a block diagram of an exemplary computational system according to an aspect of this disclosure.

As shown in FIG. 7, a computational system 700 in accordance with this disclosure can be implemented using a microprocessor or its equivalent, such as a central processing unit CPU 702 or at least one application specific processor ASP 704. The microprocessor utilizes a computer readable storage medium, such as a memory 706 (e.g., ROM, EPROM, EEPROM, flash memory, static memory, DRAM, SDRAM, and their equivalents), configured to control the microprocessor to perform the methods of this disclosure. Other storage mediums can be controlled via a controller, such as a disk controller 708, which controls a hard disk drive 710 and a CD-ROM drive 712.

The microprocessor, in an alternate embodiment, can include or exclusively include a logic device for augmenting or fully implementing the claimed invention. Such a logic device includes, but is not limited to, an application-specific integrated circuit (ASIC), a field programmable gate array (FPGA), a generic-array of logic (GAL), and their equivalents. The microprocessor can be a separate device or a single processing mechanism. However, in a preferred aspect of this disclosure, the microprocessor is a multi-core processor, such as an Intel Core® or Xeon based processor manufactured by Intel Corporation, including x86 instruction set capabilities. Accordingly, this disclosure can benefit form parallel processing capabilities of a multi-cored CPU.

In another aspect, processing in accordance with this disclosure is performed at least in part by a display controller 714, which preferably includes at least one graphic processing unit, for improved computational efficiency. The display controller 714 can be connected to a display 716 to display the various processes and algorithms of this disclosure, and an input/output interface 718 can be provided for connecting a keyboard 720 and a pointing device 722 for controlling parameters of the various processes and algorithms of this disclosure. Further, the above noted components can be coupled to a network 724, such as the Internet, via a network interface 726 for the transmission or reception of data, including 3D data from a 3D scanning device. Optionally, a 3D scanning device 728 may be coupled directly to the system 700 for directly inputting 3D data points and recording the same onto, e.g., the disk 710. Lastly, a central BUS 730 connects the above-noted components together and provides at least one path for digital communication there between.

Any processes, descriptions or blocks in flow charts should be understood as representing modules, segments, portions of code which include one or more executable instructions for implementing specific logical functions or steps in the processes/algorithms, and alternate implementations are included within the scope of the exemplary embodiments of the present invention in which functions may be executed out of order from that shown or discussed, including substantially concurrently or in reverse order, depending upon the functionality involved, as would be understood by those skilled in the art.

Moreover, as will be recognized by a person skilled in the art with access to the teachings of this disclosure, several combinations and modifications of the present invention can be envisaged without leaving the scope of the present invention encompassed by the appended claims. Thus, numerous modifications and variations of the claimed invention are possible in light of the above teachings, and it is therefore to be understood that within the scope of the appended claims, the invention may be practiced otherwise than as specifically described herein.

The invention claimed is:

1. A method, comprising:
   imaging an object in three dimensions by collecting three-dimensional data points of the object;
   binning the data points of the imaged object into three dimensional bins having a predetermined three-dimensional size to create a binned scanned object in a three-dimensional space;
   determining a density value of the data in each of the bins by calculating a number of the data points in each of the bins;
   creating receptive fields of three dimensional feature maps, including processing elements, each of the processing elements of a same feature map having a same adjustable parameter, which is defined as a weight;
   generating an output value, by processing the density values with the processing elements, for at least each three dimensional location of the imaging of the object having a density value above a predetermined threshold value;
   classifying the object by processing the output values with a committee of classifiers, which includes a cascading series of classifiers; and
   communicating the classification of the object.

2. The method according to claim 1, wherein the determining the density value of the data in each bin is based on a viewing angle of the object, which is defined as an index.

3. The method according to claim 2, further comprising:
   normalizing the density values separately for each index.

4. The method according to claim 1, wherein the cascading series of classifiers are weak classifiers, which are trained using an AdaBoost process.

5. The method according to claim 4, further comprising:
   ranking the output values generated by processing the density values p with the processing elements, selecting maximum values of the output values, and recording a location of the maximum values of the output values in the respective feature map, and
   at least one of the weak classifiers is trained using the AdaBoost process with the selected maximum values of the output values and the recorded locations of the maximum values.

6. A non-transitory computer readable medium including computer executable instructions, which when executed by a processor, cause a computer system to perform a method, the method comprising:
   imaging an object in three dimensions by collecting three-dimensional data points of the object;
   binning the data points of the imaged object into three dimensional bins having a predetermined three-dimensional size to create a binned scanned object in a three-dimensional space;
   determining a density value of the data in each of the bins by calculating a number of the data points in each of the bins;
   creating receptive fields of three dimensional feature maps, including processing elements, each of the processing elements of a same feature map having a same adjustable parameter, which is defined as a weight;
   generating an output value, by processing the density values with the processing elements, for at least each three dimensional location of the imaging of the object having a density value above a predetermined threshold value;

classifying the object by processing the output values with a committee of classifiers, which includes a cascading series of classifiers; and communicating the classification of the object.

7. The non-transitory computer readable medium according to claim 6, wherein the determining the density value of the data in each bin is based on a viewing angle of the object, which is defined as an index.

8. The non-transitory computer readable medium according to claim 7, the method further comprising:

normalizing the density values separately for each index.

9. The non-transitory computer readable medium according to claim 6, wherein the cascading series of classifiers are weak classifiers, which are trained using an AdaBoost process.

10. The non-transitory computer readable medium according to claim 9, the method further comprising:

ranking the output values generated by processing the density values p with the processing elements, selecting maximum values of the output values, and recording a location of the maximum values of the output values in the respective feature map, and at least one of the weak classifiers is trained using the AdaBoost process with the selected maximum values of the output values and the recorded locations of the maximum values.

11. A computer system, comprising:

means for imaging an object in three dimensions by collecting three-dimensional data points of the object;

means for binning the data points of the imaged object into three dimensional bins having a predetermined three-dimensional size to create a binned scanned object in a three-dimensional space;

means for determining a density value of the data in each of the bins by calculating a number of the data points in each of the bins;

means for creating receptive fields of three dimensional feature maps, including processing elements, each of the processing elements of a same feature map having a same adjustable parameter, which is defined as a weight;

means for generating an output value, by processing the density values with the processing elements, for at least each three dimensional location of the imaging of the object having a density value above a predetermined threshold value;

means for classifying the object by processing the output values with a committee of classifiers, which includes a cascading series of classifiers; and means for communicating the classification of the object.

12. The computer system according to claim 11, wherein the means for determining determines the density value of the data in each bin based on a viewing angle of the object, which is defined as an index.

13. The computer system according to claim 12, further comprising:

means for normalizing the density values separately for each index.

14. The computer system according to claim 11, wherein the cascading series of classifiers are weak classifiers, which are trained using an AdaBoost process.

15. The computer system according to claim 14, wherein the means for generating the output value by processing the density values with the processing elements ranks the output values, selects maximum values of the output values, and records a location of the maximum values of the output values in the respective feature map, and at least one of the weak classifiers is trained using the AdaBoost process with the selected maximum values of the output values and the recorded locations of the maximum values.

16. The method according to claim 1, wherein the processing elements are transformations that are applied to a product of the weight and the density values in the processing the density values with the processing elements.

17. The method according to claim 16, wherein the processing elements are nonlinear transformations.

18. The non-transitory computer readable medium according to claim 6, wherein the processing elements are transformations that are applied to a product of the weight and the density values in the processing the density values with the processing elements.

19. The non-transitory computer readable medium according to claim 18, wherein the processing elements are nonlinear transformations.

20. The computer system according to claim 11, wherein the processing elements are transformations that are applied to a product of the weight and the density values in the processing the density values with the processing elements.

21. The computer system according to claim 20, wherein the processing elements are nonlinear transformations.

* * * * *